US011134356B2

(12) United States Patent
Usui et al.

(10) Patent No.: US 11,134,356 B2
(45) Date of Patent: Sep. 28, 2021

(54) SPEECH PROVIDING DEVICE, SPEECH REPRODUCING DEVICE, SPEECH PROVIDING METHOD, AND SPEECH REPRODUCING METHOD

(71) Applicants: Yamaha Corporation, Hamamatsu (JP); Fujitsu Limited, Kanagawa (JP)

(72) Inventors: Jun Usui, London (GB); Yukio Tada, Iwata (JP); Takahiro Asano, Hamamatsu (JP); Toru Kamiwada, Kawasaki (JP); Hiroki Uchida, Ota-ku (JP); Tomomi Yokoyama, Shinjuku-ku (JP)

(73) Assignees: Yamaha Corporation, Hamamatsu (JP); Fujitsu Limited, Kawasaki (JP)

( * ) Notice: Subject to any disclaimer, the term of this patent is extended or adjusted under 35 U.S.C. 154(b) by 0 days.

(21) Appl. No.: 16/398,443

(22) Filed: Apr. 30, 2019

(65) Prior Publication Data

US 2019/0261123 A1 Aug. 22, 2019

Related U.S. Application Data

(63) Continuation of application No. PCT/JP2017/040336, filed on Nov. 8, 2017.

(30) Foreign Application Priority Data

Nov. 8, 2016 (JP) .............................. JP2016-218242

(51) Int. Cl.
*H04S 7/00* (2006.01)
*G10L 13/00* (2006.01)
(Continued)

(52) U.S. Cl.
CPC .............. *H04S 7/303* (2013.01); *G06F 13/00* (2013.01); *G09F 25/00* (2013.01); *G10K 15/02* (2013.01);
(Continued)

(58) Field of Classification Search
CPC . H04S 7/303; H04S 7/30; H04S 7/301; H04S 7/302; H04S 7/304; H04S 7/308;
(Continued)

(56) References Cited

U.S. PATENT DOCUMENTS 8,718,301 B1 * 5/2014 Jouppi .................... H04S 7/303
381/310
8,838,384 B1 * 9/2014 Daily ................. G01C 21/3629
701/516
(Continued)

FOREIGN PATENT DOCUMENTS

JP  2001-238266 A  8/2001
JP  2014-16694 A   1/2014

OTHER PUBLICATIONS

International Search Report (PCT/ISA/210) issued in PCT Application No. PCT/JP2017/040336 dated Jan. 30, 2018 with English translation (five (5) pages).
(Continued)

*Primary Examiner* — Andrew C Flanders
(74) *Attorney, Agent, or Firm* — Crowell & Moring LLP

(57) ABSTRACT

A speech providing device includes a memory that stores instructions, and a processor that executes the instructions. The instructions cause the processor to perform acquiring a position of a user and a direction that the user is facing, and providing a speech corresponding to an area existing in a direction that the user is facing on the basis of the position of the user, to the user.

16 Claims, 3 Drawing Sheets

(51) Int. Cl.
*H04R 1/32* (2006.01)
*H04M 3/487* (2006.01)
*G06F 13/00* (2006.01)
*H04R 3/00* (2006.01)
*G10K 15/02* (2006.01)
*G09F 25/00* (2006.01)

(52) U.S. Cl.
CPC ............. *G10L 13/00* (2013.01); *H04M 3/487* (2013.01); *H04R 1/323* (2013.01); *H04R 3/00* (2013.01)

(58) Field of Classification Search
CPC ..... H04S 2400/11; G10K 15/02; G10L 13/00; G10L 19/008; H04M 3/487; G06F 3/012; G06F 3/013; G06F 3/16; G06F 3/162; G06F 3/165; G06F 3/167; G06F 3/3046; G06F 11/3058; G06F 16/487; G06F 16/686; G06F 16/687
See application file for complete search history.

(56) References Cited

U.S. PATENT DOCUMENTS

| | | | | |
|---|---|---|---|---|
| 10,224,033 | B1* | 3/2019 | Lim | H04R 1/406 |
| 2002/0156633 | A1* | 10/2002 | Hickey | G11B 19/025 |
| | | | | 704/270 |
| 2005/0179701 | A1* | 8/2005 | Jahnke | H04S 7/30 |
| | | | | 345/619 |
| 2008/0008342 | A1* | 1/2008 | Sauk | G01C 21/165 |
| | | | | 381/315 |
| 2010/0292917 | A1* | 11/2010 | Emam | G01C 21/26 |
| | | | | 701/533 |
| 2011/0288860 | A1* | 11/2011 | Schevciw | G10L 25/78 |
| | | | | 704/233 |
| 2012/0128186 | A1* | 5/2012 | Endo | H04R 25/407 |
| | | | | 381/313 |
| 2013/0076853 | A1* | 3/2013 | Diao | H04N 7/15 |
| | | | | 348/14.08 |
| 2013/0272539 | A1* | 10/2013 | Kim | G06F 3/0484 |
| | | | | 381/92 |
| 2013/0300648 | A1* | 11/2013 | Kim | G06F 3/011 |
| | | | | 345/156 |
| 2013/0322667 | A1* | 12/2013 | Christensen | H04R 5/033 |
| | | | | 381/309 |
| 2014/0009644 | A1 | 1/2014 | Sako et al. | |
| 2014/0219485 | A1* | 8/2014 | Jensen | H04R 25/405 |
| | | | | 381/313 |
| 2014/0270182 | A1* | 9/2014 | Vilermo | H04S 7/303 |
| | | | | 381/17 |
| 2015/0196101 | A1* | 7/2015 | Dayal | G06F 1/163 |
| | | | | 63/1.11 |
| 2015/0301592 | A1* | 10/2015 | Miller | G06F 3/016 |
| | | | | 345/156 |
| 2015/0302867 | A1* | 10/2015 | Tomlin | G10L 25/78 |
| | | | | 704/270 |
| 2017/0221500 | A1* | 8/2017 | Glasgow | G02B 27/022 |
| 2019/0244258 | A1* | 8/2019 | Curiel | A63F 13/211 |

OTHER PUBLICATIONS

Japanese-language Written Opinion (PCT/ISA/237) issued in PCT Application No. PCT/JP2017/040336 dated Jan. 30, 2018 (four (4) pages).

Japanese-language Office Action issued in Japanese Application No. 2018-550237 dated Jul. 28, 2020 with English translation (six pages).

* cited by examiner

| USER ID | ATTRIBUTE 1 (GENDER) | ATTRIBUTE 2 (AGE) | ATTRIBUTE 3 (INTEREST) | ATTRIBUTE 4 (INTEREST) | ... |
|---|---|---|---|---|---|
| U0001 | MALE | 32 | ROCK MUSIC | FASHION | ... |
| U0002 | FEMALE | 28 | MOVIES | FLOWERS | ... |
| U0003 | MALE | 49 | READING | RUNNING | ... |
| U0004 | MALE | 18 | MOUNTAIN CLIMBING | MOTORCYCLES | ... |
| ... | ... | ... | ... | ... | ... |
| ... | ... | ... | ... | ... | ... |

| AREA ID | POSITION | AREA ATTRIBUTE | SPEECH ID |
|---|---|---|---|
| A000001 | N1 E1 | OUTDOOR SHOP, CAMP | M000001 |
| A000002 | N2 E2 | CAFE, ORGANIC | M000002 |
| A000003 | N3 E3 | ROCK CONCERT, FOREIGN MUSICIAN | M000003 |
| A000004 | N4 E4 | BOOKSTORE | M000004 |
| ... | ... | ... | ... |
| ... | ... | ... | ... |

SPEECH PROVIDING DEVICE, SPEECH REPRODUCING DEVICE, SPEECH PROVIDING METHOD, AND SPEECH REPRODUCING METHOD

CROSS REFERENCE TO RELATED APPLICATIONS

This application is a continuation of PCT application No. PCT/JP2017/040336, which was filed on Nov. 8, 2017 based on Japanese Patent Application (No. 2016-218242) filed on Nov. 8, 2016, the contents of which are incorporated herein by reference.

BACKGROUND OF THE INVENTION

1. Field of the Invention

The present invention relates to a technology for providing speeches to a user.

2. Description of the Related Art

Technologies for providing information corresponding to the position of a user to the user are known. For example, JP-A-2001-238266 discloses a technology in which, when an advertisement of a facility or a store is distributed to a mobile terminal, information to be distributed is switched depending on the distance between the facility or the store and the mobile terminal.

On the other hand, an object of the present invention is to achieve workings for providing information wherein the position and direction of a user are associated with a speech.

SUMMARY OF THE INVENTION

In order to solve the above-mentioned problem, the present invention provides a speech providing device being equipped with an acquiring section that acquires a position of a user and a direction that the user is facing, and a providing section that provides a speech corresponding to an area existing in a direction that the user is facing on the basis of the position of the user, to the user.

Furthermore, the present invention provides a speech reproducing device being equipped with a detecting section that detects a position of a user and a direction that the user is facing, an acquiring section that acquires speech data corresponding to an area existing in a direction that the user is facing on the basis of the position of the user, and a reproducing section that reproduces the speech data.

Moreover, the present invention provides a speech providing method including a step of acquiring a position of a user and a direction that the user is facing, and a step of providing a speech corresponding to an area existing in the direction that the user is facing on the basis of the position of the user, to the user.

Still further, the present invention provides a speech reproducing method including a step of detecting a position of a user and a direction that the user is facing, a step of acquiring speech data corresponding to an area existing in the direction detected on the basis of the detected position of the user, and a step of reproducing the acquired speech data.

The present invention can achieve workings for providing information in which the position and direction of the user are associated with the speech.

DETAILED DESCRIPTION OF THE EXEMPLARY EMBODIMENTS

Figure 1:
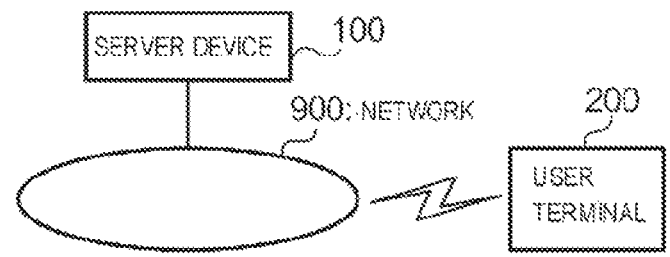
FIG. 1 is a view showing an entire configuration of a speech providing system according to an embodiment of the present invention.

FIG. 1 is a view showing an entire configuration of a speech providing system according to an embodiment of the present invention. In this speech providing system, a speech characteristic with respect to each of a plurality of predetermined areas, for example, an area having an artificial facility, such as a commercial store, a game facility, an amusement facility, a public facility or an event site and an area having a natural environment, such as a sea, a river or a mountain, is associated with the corresponding area. The speech characteristic with respect to the area is, for example, in the case of a commercial store, the background music or the commercial song of the commercial store; in the case of a movie theater, the sound of the movie being shown or the explanatory narration of the movie; in the case of an amusement park, the cheers of park visitors or the theme song of the amusement park; in the case of a sea, the sound of waves or a music piece from which a sea is imagined; in the case of a river, the murmur of a stream or the sound of a waterfall; and in the case of a mountain, the tweet of birds or the chirping of insects. Furthermore, in this speech providing system, the speech corresponding to the area existing in the direction in which the face of the user faces (in other words, the visual line direction of the user) on the basis of the position of the user is provided to the user. The user listens to the provided speech, thereby being capable of grasping what kind of area exists in the direction in which the user is facing by the image (impression) of the speech.

As shown in FIG. 1, the speech providing system includes a server device 100 including a processor for providing speeches to the user and a user terminal 200 to be used by the user. The server device 100 and the user terminal 200 are communicatively connected via a network 900. The network 900 is not limited to a single communication network, but may be a plurality of communication networks being different in communication system, for example, wired or wireless communication networks, such as the Internet and mobile communication networks. Although only one server device 100 and only one user terminal 200 are shown in FIG. 1, each of these may also be provided in plural number.

Figure 2:
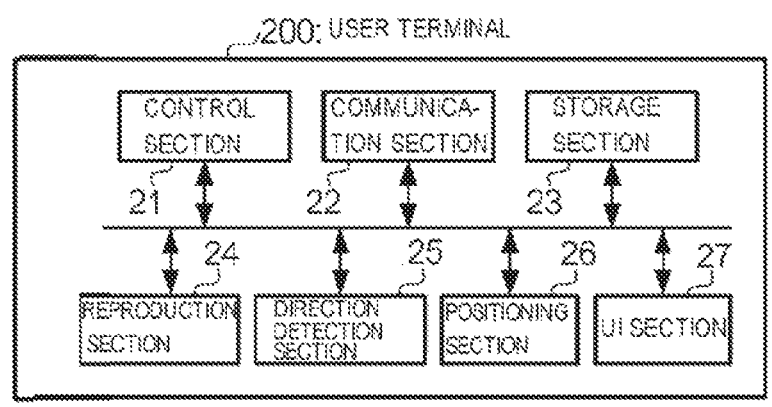
FIG. 2 is a block diagram showing a hardware configuration of a user terminal in the speech providing system.

FIG. 2 is a block diagram showing a hardware configuration of the user terminal 200. The user terminal 200 is a computer capable of performing communication, such as a smart phone, a tablet or one of various kinds of wearable terminals. The user terminal 200 includes, for example, a control section 21 equipped with an arithmetic processor, such as a CPU (Central Processing Unit) and storages, such as a ROM (Read Only Memory) and a RAM (Random Access Memory), a communication section 22 including, for example, an antenna and a communication circuit for performing communication via the network 900, a storage section 23, for example, an EEPROM (Electrically Erasable and Programmable ROM) or a flash memory, a reproduction section 24 including, for example, a speaker or an earphone connection terminal and an amplifier for reproducing speech data and outputting speeches, a direction detection section 25 including, for example, a direction sensor and a gyro sensor, for detecting the direction in which the user terminal 200 is facing (the direction of the user terminal 200 is herein assumed to be the direction that the user is facing), a positioning section 26 for performing positioning using a GPS (Global Positioning System), and a UI (User Interface) section 27 including an operation section having operation elements, for example, keys and touch sensors, and a display section, for example, a liquid crystal panel and a liquid crystal drive circuit.

Figure 3:
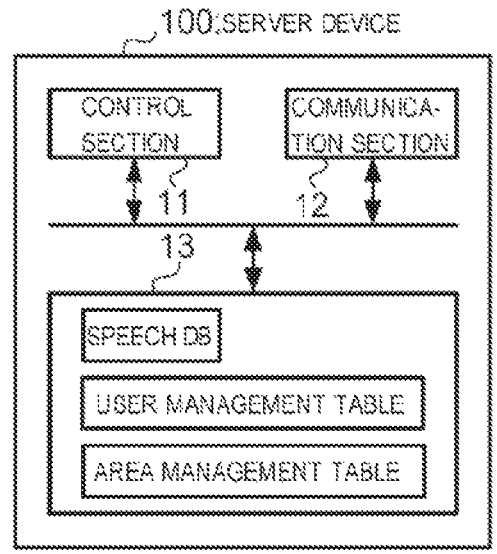
FIG. 3 is a block diagram showing a hardware configuration of a server device in the speech providing system.

FIG. 3 is a block diagram showing a hardware configuration of the server device 100. The server device 100 is a computer, such as a server machine, and includes a control section 11, a communication section 12 and a storage section 13. The control section 11 includes an arithmetic operation device, such as a CPU, and storage devices, such as a ROM and a RAM. The CPU executes programs stored in the ROM and the storage section 13 by using the RAM as a work area, thereby controlling the operations of various sections of the server device 100. The communication section 12 is connected to the network 900 and performs communication via the network 900. The storage section 13 is, for example, a storage device, such as a hard disc, and stores data groups and program groups to be used by the control section 11. More specifically, the storage section 13 stores a speech database (the database is hereafter referred to as DB) including speech data indicating various kinds of speeches, a user management table describing information concerning users, and an area management table describing information concerning areas.

Figures 4, 5, 6:
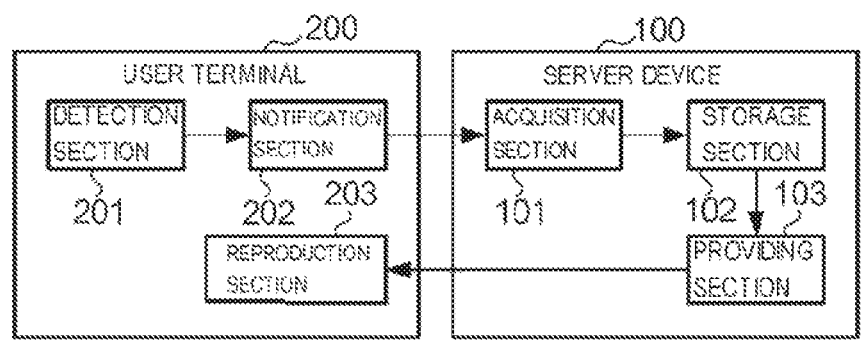
FIG. 4 is a view showing an example of a user management table stored in a server device.
FIG. 5 is a view showing an example of an area management table stored in the server device.
FIG. 6 is a block diagram showing function configurations of respective devices in the speech providing system.

As shown in FIG. 4, in the user management table, the user ID serving as identification information for identifying each user is associated with the attribute group (for example, the gender, age and interests of the user) of the user. The attribute group of the user has been registered or declared in advance by the user.

As shown in FIG. 5, in the area management table, the area ID serving as identification information for identifying each area is associated with the position information indicating the position of the area, the attribute of the area, and the speech ID serving as identification information for identifying the speech data corresponding to the area. Since each area has a certain width, the position of the area indicates the range of the whole area. The attribute of the area is information characterizing the area and is used for matching the speech corresponding to the area against the user. The speech ID is the file name of each piece of speech data included in the speech database.

FIG. 6 is a view showing function configurations of the user terminal 200 and the server device 100. The detection section 201 of the user terminal 200 detects the position of the user and the direction that the user is facing. The notification section 202 of the user terminal 200 notifies the position of the user and the direction that the user is facing detected by the detection section 201 to the server device 100.

The acquisition section 101 of the server device 100 acquires the position of the user and the direction that the user is facing which are notified from the notification section 202 of the user terminal 200. The storage section 102 of the server device 100 stores the speech data indicating speeches and the areas so as to be associated mutually. The providing section 103 of the server device 100 provides the speech data corresponding to the area existing in the direction acquired by the acquisition section 101 on the basis of the position of the user acquired by the acquisition section 101. More specifically, the providing section 103 extracts the area existing in the direction that the user is facing from a plurality of areas on the basis of the position of the user, reads the speech data associated with the area, and provides the speech data to the user terminal 200. Furthermore, the providing section 103 acquires the attributes of the user and provides, to the user terminal 200, the speech data corresponding to the acquired attributes from among the speech data corresponding to the extracted area. At this time, the providing section 103 provides the speech data, the sound volume of which is controlled so as to correspond to the distance between the position of the user and the above-mentioned area.

The reproduction section 203 of the user terminal 200 reproduces the speech data provided from the server device 100 and outputs a speech. The user listens to the speech reproduced from the user terminal 200.

The detection section 201 of the above-mentioned user terminal 200 is achieved by the direction detection section 25 and the positioning section 26 shown in FIG. 2, the notification section 202 is achieved by the communication section 22 shown in FIG. 2, and the reproduction section 203 is achieved by the reproduction section 24 shown in FIG. 2. The acquisition section 101 of the server device 100 is achieved by the communication section 12 shown in FIG. 3, the storage section 102 is achieved by the storage section 13 shown in FIG. 3, and the providing section 103 is achieved by the control section 11 and the communication section 12 shown in FIG. 3.

[Operation]

Figure 7:
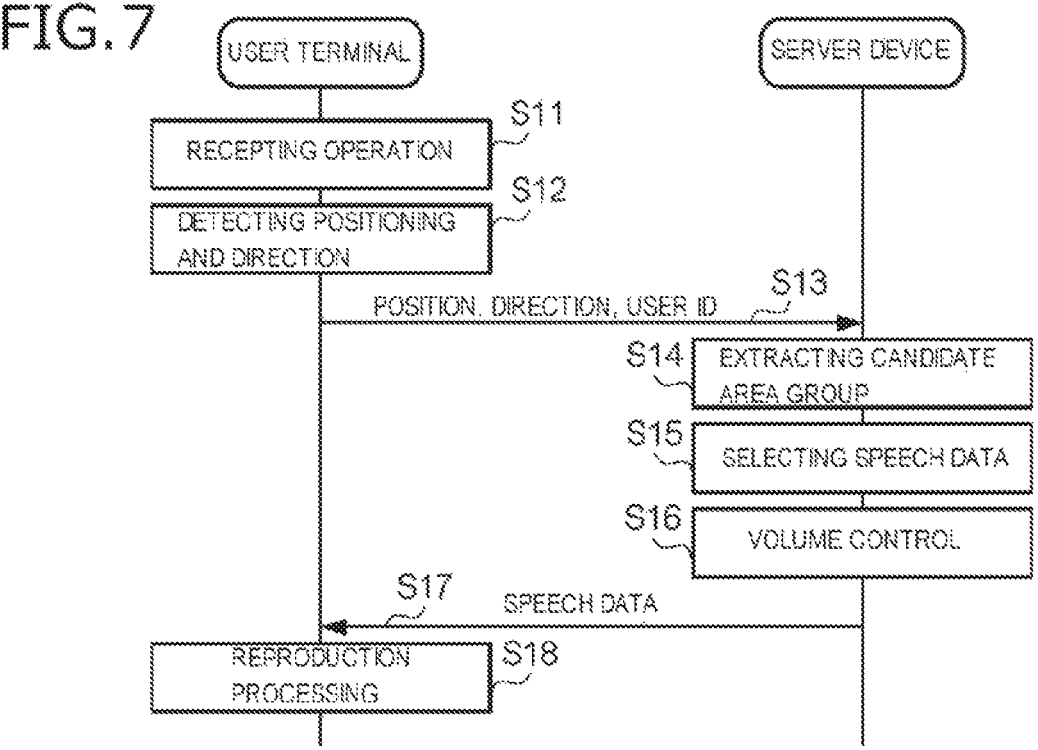
FIG. 7 is a sequence diagram showing an example of the operation of the speech providing system.

Next, the operation of this embodiment will be described referring to FIG. 7. First, the user directs the user terminal 200 in a certain direction and performs operation to instruct the acquisition of the speech in the area existing in the direction. The certain direction herein may be, for example, the direction in which the user can directly see an area such as a commercial store or the direction in which the user has directed the user terminal 200 without being aware of the direction in a state in which the user cannot directly see a specific area. Upon receiving this acquisition operation (at step S11), the detection section 201 of the user terminal 200 detects the position of the user and the direction that the user is facing (at step S12). As described above, the position of the user is herein the position of the user terminal 200, and the direction that the user is facing is the direction the user terminal 200 is facing. And then, the notification section 202 notifies the position of the user and the direction that the user is facing together with the user ID to the server device 100 (at step S13). The user ID may be the user ID preliminarily stored in the storage section 23 or may be the user ID having been input to the user terminal 200 by the user at the time when the user logged in to this speech providing service.

Figure 8:
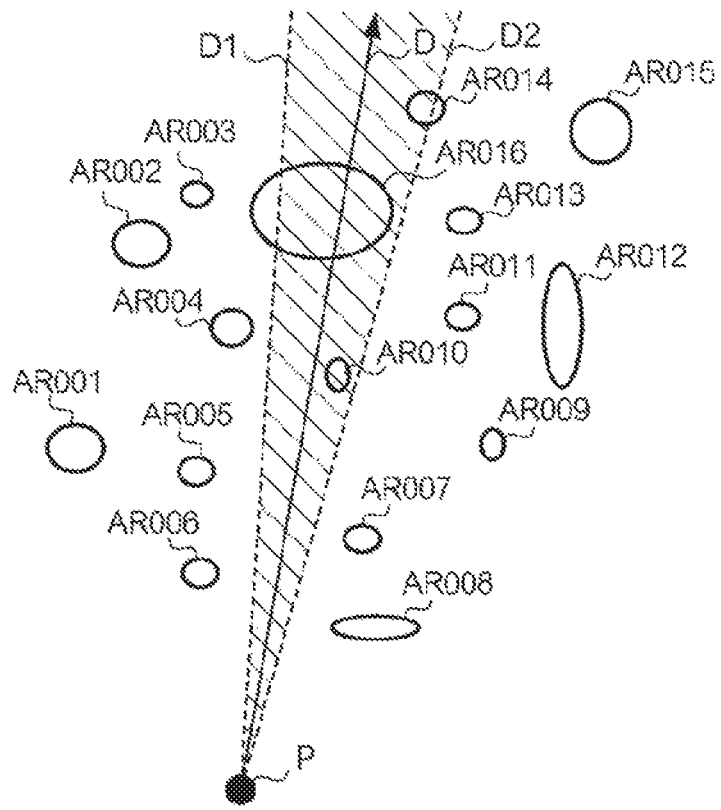
FIG. 8 is a schematic view showing the relationship between the position and direction of a user and an area with which a speech is associated.

The acquisition section 101 of the server device 100 acquires the position of the user, the direction that the user is facing and the user ID notified from the notification section 202 of the user terminal 200. The providing section 103 refers to the positions of the respective areas in the area management table and then extracts the areas existing in the direction acquired on the basis of the acquired position of the user as a candidate area group (at step S14). More specifically, as shown in FIG. 8, when the user faces a direction D at a position P, areas, at least parts of which overlap with the range (the range sandwiched between the half line D1 and the half line D2 in the figure) of a predetermined angle with the half line indicating the direction D used as the center, that is to say, areas AR010, AR014 and AR016, are extracted.

Next, on the basis of the attributes of the areas and the attributes of the user, the providing section 103 selects the speech corresponding to any one of the areas in the extracted candidate area group (at step S15). More specifically, first, the providing section 103 refers to the area management table and reads the attributes associated with the respective area IDs of the extracted candidate area group. Next, the providing section 103 refers to the user management table and reads the attribute group of the user associated with the user ID acquired at step S13. And then, the providing section 103 compares the respective attributes of the candidate area group with the attributes of the user, calculates the degree of association therebetween, and specifies the area provided with an attribute that has the highest degree of association with the attributes of the user. For example, in the examples shown in FIGS. 4 and 5, since the user with user ID 00001 is interested in rock music, in the case that the area with area ID A000003 having an attribute indicating a rock concert is included in the candidate area group, this area is specified. A known algorithm may be used as the algorithm for calculating the degree of association to be used here. And then, the providing section 103 refers to the area management table and selects the speech data with the speech ID corresponding to the area ID of the specified area.

Moreover, the providing section 103 calculates the distance between the position of the area and the position of the user and sets the sound volume of the speech data so as to correspond to the distance (at step S16). For example, the providing section 103 sets the sound volume parameter included in the speech data so that the sound volume is small in the case that the distance between the position of the area and the position of the user is large and so that the sound volume is large in the case that the distance between the position of the area and the position of the user is small.

The providing section 103 reads the speech data, the sound volume parameter of which has been set, from the storage section 102 and transmits the speech data to the user terminal 200 via the network 900 (at step S17).

The reproduction section 203 of the user terminal 200 acquires the speech data transmitted from the providing section 103 and performs speech reproduction according to the sound volume parameter having been set in the speech data (at step S18). As a result, the user can know what is located in the direction that the user is facing by the image of the speech and can sensuously know the distance to the area by the magnitude of the sound volume.

With the embodiment described above, it is possible to achieve new workings for providing information wherein the position and direction of the user are associated with the speech. Furthermore, the user can grasp the image of the area by listening to the speech characteristic with respect to the area existing in the direction that the user is facing. On the other hand, the side (for example, the manager of a commercial store) preparing the speech of the area can expect a customer attraction effect attracting the user to the commercial store or the like by providing the speech to the user.

[Modification]

The above-mentioned embodiment can be modified as described below.

Furthermore, the following modifications may be combined mutually and put into practical use.

[Modification 1]

In the embodiment, speech data is transmitted to the user terminal 200 that is used by each user, whereby a speech is provided to the user. However, a speech may also be provided to the user, for example, by sound emitting devices, such as a speaker, installed inside or adjacent to each area. More specifically, in each area, the speech providing system includes a function serving as an acquisition section that detects and acquires the position of the user and the direction that the user is facing and a function serving as a providing section that provides the speech corresponding to the area existing in the direction detected on the basis of the acquired position of the user. The acquisition section is achieved by, for example, a photographing device and an image processing device. The image processing device analyses the image of the user photographed by the photographing device, estimates the position of the user on the basis of the positional relationship between the image processing device itself and the user, and estimates the direction of the user's face by image recognition, thereby judging whether the user is facing the direction of the corresponding area. The providing section is achieved by a sound emitting device, such as a speaker, installed in or adjacent to the corresponding area and radiates the speech when it is judged that the user is facing the direction of the corresponding area. In this case, it is desirable that only the speech should be mainly provided to the target user by using a directional speaker or the like as a sound emitting device for achieving the providing section.

Consequently, for example, in the case that the speech providing device is installed at the front of a commercial store and when the user outside the commercial store looks at the direction toward the commercial store, the speech providing device can radiate the speech relating to the commercial store to the user. The user listens to the characteristic speech relating to the commercial store existing in the direction that the user is facing, thereby being capable of grasping the characteristics of the commercial store, and the manager of the commercial store can expect a customer attraction effect.

[Modification 2]

The speeches to be provided to the user are not limited to those stored preliminarily in the storage section 102, but may be speeches emitted or collected in respective areas. For example, in the case of a commercial store, the speech may be the background music emitted in the commercial store; in the case of a movie theater, the speech may be the sound of the movie being shown actually; in the case of an amusement park, the speech may be the cheers of park visitors collected in real time or the announcement inside the park; and in the case of a river, the speech may be the murmur of a stream collected in real time.

[Modification 3]

In the embodiment, on the basis of the attributes of the areas and the attributes of the user, the providing section 103 selects the speech corresponding to any one of the areas in the extracted candidate area group. However, the method for selecting the speech is not limited to this method. For example, the providing section 103 may acquire the range of the position designated by the user and may select the speech corresponding to the area in the range of the acquired position from among the speech group corresponding to the area existing in the direction that the user is facing. More specifically, the user designates the distance between the position of the user and the position of the area in a predetermined range, for example, 0 to 200 m, at step S11 in FIG. 7 or in advance. At step S15, the providing section 103 specifies the area included within the above-mentioned range from among the extracted candidate area group and selects the speech data with the speech ID corresponding to the area ID of the specified area. The content to be designated by the user is not limited to the range of the distance between the position of the user and the position of the area described above, but may be the range of the distance between the position serving as a reference and the position of the area, for example, the range of the distance from a station or a stop of public transportation to the area. Furthermore, the content to be designated by the user may be the attribute of the area or may be the position of the area directly designated by the user. In addition, the above-mentioned designation by the user may be performed according to a menu in which, for example, various kinds of contents to be designated are listed or may be performed on a map.

Moreover, when selecting the speech corresponding to any one of the areas in the candidate area group, the providing section 103 may select the speeches corresponding to a plurality of areas, instead of selecting one speech. In this case, the sound volume of each speech may be controlled depending on the distance between the position of the user and the position of each area. For example, the providing section 103 sets the sound volume parameter included in the speech data so that the sound volume is small in the case that the distance between the position of the area and the position of the user is large and so that the sound volume is large in the case that the distance between the position of the area and the position of the user is small.

[Modification 4]

In the embodiment, on the basis of the distance between the position of the area and the position of the user, the providing section 103 controls the sound volume of the speech data; however, the method for controlling the sound volume is not limited to this method. For example, the providing section 103 may provide the speech having the sound volume corresponding to the coincidence degree between the direction that the user is facing and the area on the basis of the position of the user to the user. More specifically, in the case of the example shown in FIG. 8, the providing section 103 controls the sound volume of the speech data on the basis of the size of the region in which the range (the range sandwiched between the half line D1 and the half line D2 in the figure) of the predetermined angle with the half line indicating the direction D the user is facing used as the center overlaps with the respective areas. For example, the providing section 103 sets the sound volume parameter included in the speech data so that the sound volume is large in the case that the overlapping region is large and so that the sound volume is small in the case that the overlapping region is small. The size of the overlapping region may be the absolute value of the area of the region or may be the value of a fraction in which the area of the entire area is used as the denominator and the area of the overlapping region is used as the numerator.

As described above, the providing section 103 provides the speech having the sound volume corresponding to the positional relationship between the user and the area (the coincidence degree based on the distance between the positions of the two or the coincidence degree based on the positions of the two) to the user.

Furthermore, not only the processing for changing the sound volume of the speech data, but also acoustic processing for changing the acoustic parameters of the speech data, such as the tone and effect of the speech data, may be performed on the basis of the positional relationship between the area and the user. For example, the low frequency range may be reduced depending on the distance between the area and the user using an equalizer (for example, only the low-frequency sound components are made small in the case that the distance is large), or the intensity of effect, such as delay or reverberation, may be changed depending on the distance between the area and the user (for example, the intensity of reverberation is raised in the case that the distance is large).

Moreover, for example, the providing section 103 may provide the speech having the sound volume corresponding to the degree of association between the attributes of the user and the attribute of the area. More specifically, the providing section 103 refers to the area management table and reads the attributes associated with the respective area IDs of the extracted candidate area group. Next, the providing section 103 refers to the user management table and reads the attribute group of the user associated with the user ID acquired at step S13. And then, the providing section 103 compares the respective attributes of the candidate area group with the attributes of the user, calculates the degree of association therebetween, and controls the sound volume of the speech data on the basis of the magnitude of the degree of association. For example, the providing section 103 sets the sound volume parameter included in the speech data so that the sound volume is large in the case that the degree of association is large and so that the sound volume is small in the case that the degree of association is small.

Also in this case, as in the case that the acoustic processing is performed depending on the positional relationship between the user and the area, the providing section 103 may provide the speech that has been subjected to acoustic processing corresponding to the degree of association between the attributes of the user and the attribute of the area. In other words, for example, the low frequency range may be reduced depending on the degree of association between the attributes of the user and the attribute of the area using an equalizer (for example, only the low-frequency sound components are made small in the case that the degree of association is small), or the intensity of effect, such as delay or reverberation, may be changed depending on the degree of association between the attributes of the user and the attribute of the area (for example, the intensity of reverberation is raised in the case that the degree of association is small).

[Modification 5]

In the case that the direction that the user is facing changes, the providing section 103 may provide a speech while continuously changing the speech depending on the change in the direction. For example, when the user changes the direction that the user is facing by turning his/her neck, the speech corresponding to each direction is emitted while the speech is changed continuously. Furthermore, the speech may be provided depending on the rate of the change in the direction that the user is facing. Hence, for example, in the case that the speech providing device is installed at the front of a commercial store, at the timing when the direction that the user is facing is changed, for example, when the user who is outside the commercial store and looking toward the commercial store turns and looks toward another commercial store, or when the direction that the user is facing is changed after the user started walking, the providing section 103 may provide the speech corresponding to the direction to the user. Moreover, when the position of the user is changed, the providing section 103 may provide a speech while continuously changing the speech depending on the change in the position. For example, when the user moves, the user can hear a speech that changes continuously corresponding to the change in the position of the user who is moving. What's more, the providing section 103 may provide a speech that changes depending on the rate of the change in the position the user is facing and the speed of the change.

[Modification 6]

The workings for providing the speech according to the present invention may be used to guide the user to a certain area by using speeches. For example, in the case that the speech corresponding to the area existing in the direction that the user is facing is provided with a role of guiding the user to the area, the user can be guided to the area which is not visible from the user at first, by repeatedly guiding the user to areas which are visible from the user a plurality of times.

[Modification 7]

The providing section 103 may provide data other than the speech relating to the area (for example, text data describing information relating to the area and the image data showing an image relating to the area) in addition to speech data.

[Modification 8]

The block diagram of FIG. 6 having been used to describe the above-mentioned embodiment shows the blocks of functional units. Each of these functional blocks is achieved by arbitrarily combining hardware and/or software. Furthermore, a means for achieving each functional block is not limited particularly. In other words, each functional block may be achieved by one physically and/or logically combined device, or may be achieved by a plurality of devices, that is to say, two or more physically and/or logically separated devices and connected directly and/or indirectly (for example, by wire and/or wirelessly). Hence, the speech providing device or the speech reproducing device according to the present invention can be achieved by a device integrally equipped with all the respective functions described in the embodiment or can also be achieved by a system in which the function of each device is further dispersed into a plurality of devices and mounted. Moreover, the order of the steps of the processing described in the above-mentioned embodiment may be changed as long as no contradiction occurs. In the method described in the embodiment, the elements of the respective steps are presented in an exemplary order, and the order is not limited to the presented specific order.

The present invention can also be achieved by a mode, such as an information processing method performed by the speech providing device or the speech reproducing device. In other words, the present invention provides a speech providing method including a step of acquiring the position of a user and the direction that the user is facing and a step of providing the speech corresponding to the area existing in the direction acquired on the basis of the acquired position of the user. Furthermore, the present invention provides a speech reproducing method including a step of detecting the position of a user and the direction that the user is facing, a step of acquiring the speech data corresponding to the area existing in the direction detected on the basis of the detected position of the user, and a step of reproducing the acquired speech data.

Moreover, the present invention can be achieved in a mode, such as a program for making a computer function as a speech providing device or a speech reproducing device. This kind of program can be provided in a form being recorded on a recording medium, such as an optical disc, or provided in a form being downloaded to a computer via a communication network, such as the Internet, and installed so as to be usable.

The embodiment according to this disclosure will be summarized as described below.

(1) The embodiment provides a speech providing device including: an acquiring section that acquires a position of a user and a direction that the user is facing, and a providing section that provides a speech corresponding to an area existing in a direction that the user is facing on the basis of the position of the user, to the user.

(2) In the speech providing device set forth in the above-mentioned item (1), the acquiring section acquires the position of the user and the direction that the user is facing, from a user terminal used by the user, and the providing section provides speech data indicating the speech to the user terminal.

(3) In the speech providing device set forth in the above-mentioned item (1) or (2), the providing section acquires an attribute of the user and provides, to the user, the speech corresponding to the attribute of the user from among a group of speeches corresponding to areas existing in the direction that the user is facing on the basis of the position of the user.

(4) In the speech providing device set forth in any one of the above-mentioned items (1) to (3), the providing section acquires a content designated by the user and provides, to the user, the speech corresponding to the area corresponding to the acquired content from among a group of speeches corresponding to areas existing in the direction that the user is facing on the basis of the position of the user.

(5) In the speech providing device set forth in any one of the above-mentioned items (1) to (4), the providing section provides the speech subjected to acoustic processing corresponding to a positional relationship between the user and the area to the user.

(6) In the speech providing device set forth in in any one of the above-mentioned items (1) to (5), the providing section provides the speech subjected to acoustic processing corresponding to a degree of association between the attributes of the user and the attribute of the area, to the user.

(7) In the speech providing device set forth in any one of the above-mentioned items (1) to (6), the providing section provides the speech depending on a change in the position of the user or a change in the direction that the user is facing.

(8) In the speech providing device set forth in the above-mentioned item (7), the providing section provides the speech, a sound volume of which is changed depending on a change in the position of the user or a change in the direction that the user is facing, to the user.

(9) In the speech providing device set forth in the above-mentioned item (7) or (8), the providing section provides a speech changed from the speech corresponding to the area existing in the direction that the user is facing depending on a change in the direction that the user is facing, to the user.

(10) The speech providing device set forth in any one of the above-mentioned items (1) to (9), further including: a storage that stores the speech data indicating the speech and the area so as to be associated mutually, wherein the providing section reads from the storage the speech data associated with the area existing in the direction that the user is facing on the basis of the position of the user and provides the speech data to the user.

(11) In the speech providing device set forth in any one of the above-mentioned items (1) to (10), the speech is a speech being emitted or collected in the area.

(12) The embodiment provides a speech reproducing device including: a detecting section that detects a position of a user and a direction that the user is facing, an acquiring section that acquires speech data corresponding to an area existing in a direction that the user is facing on the basis of the position of the user, and a reproducing section that reproduces the speech data.

(13) The embodiment provides a speech providing method including: a step of acquiring a position of a user and a direction that the user is facing, and a step of providing a speech corresponding to an area existing in the direction that the user is facing on the basis of the position of the user, to the user.

(14) In the speech providing method set forth in the above-mentioned item (13), the acquiring step acquires the position of the user and the direction that the user is facing from a user terminal used by the user, and the providing step provides speech data indicating the speech to the user terminal.

(15) In the speech providing method set forth in the above-mentioned item (13) or (14), the providing step acquires an attribute of the user and provides, to the user, the speech corresponding to the attribute of the user from among a group of speeches corresponding to areas existing in the direction that the user is facing on the basis of the position of the user.

(16) In the speech providing method set forth in any one of the above-mentioned items (13) to (15), the providing step acquires a content designated by the user and provides, to the user, the speech corresponding to the area corresponding to the acquired content from among a group of speeches corresponding to areas existing in the direction that the user is facing on the basis of the position of the user.

(17) In the speech providing method set forth in any one of the above-mentioned items (13) to (16), the providing step provides the speech subjected to acoustic processing corresponding to a positional relationship between the user and the area to the user.

(18) In the speech providing method set forth in any one of the above-mentioned items (13) to (17), the providing step provides the speech subjected to the acoustic processing corresponding to a degree of association between the attributes of the user and the attribute of the area, to the user.

(19) In the speech providing method set forth in any one of the above-mentioned items (13) to (18), the providing step provides the speech depending on a change in the position of the user or a change in the direction that the user is facing.

(20) In the speech providing method set forth in the above-mentioned item (19), the providing step provides the speech, a sound volume of which is changed depending on a change in the position of the user or a change in the direction that the user is facing, to the user.

(21) In the speech providing method set forth in the above-mentioned item (19) or (20), the providing step provides a speech changed from the speech corresponding to the area existing in the direction that the user is facing depending on the change in the direction that the user is facing to the user.

(22) In the speech providing method set forth in any one of the above-mentioned items (13) to (21), the providing step reads the speech data associated with the area existing in the direction that the user is facing on the basis of the position of the user from a storage for storing speech data indicating the speech and the area so as to be associated mutually and provides the speech data to the user.

(23) In the speech providing method set forth in any one the above-mentioned items (13) to (22), the speech is a speech being emitted or collected in the area.

(24) The embodiment provides a speech reproducing method including a step of detecting a position of a user and a direction that the user is facing, a step of acquiring speech data corresponding to an area existing in the direction detected on the basis of the detected position of the user, and a step of reproducing the acquired speech data.

With the present invention, the user listens to the provided speech, thereby being capable of knowing what kind of area exists in the direction that the user is facing by the image produced by the speech. The present invention is thus useful in achieving workings for providing information wherein the position and direction of the user are associated with the speech.

What is claimed is:

1. A speech providing device comprising:
a positioning sensor;
a direction sensor;
a memory that stores instructions; and
a processor that executes the instructions,
wherein the instructions cause the processor to perform:
acquiring a position of a user via the positioning sensor and a direction that the user is facing via the direction sensor;
acquiring an attribute of the user;
specifying a specified area based on a degree of association between the attribute of the user and attributes of areas; and
providing a speech to the user corresponding to the specified area, wherein
the speech is subjected to acoustic processing corresponding to the position of the user and a position of the specified area; and
the acoustic processing includes reducing a low frequency range of the speech depending on a magnitude of a degree of association that results from comparing attributes of the user and attributes of the specified area.

2. The speech providing device according to claim 1, wherein the instructions cause the processor to perform:
acquiring the position of the user and the direction that the user is facing, from a user terminal used by the user; and
providing speech data indicating the speech to the user terminal.

3. The speech providing device according to claim 1, wherein the instructions cause the processor to perform:
acquiring a content designated by the user and providing, to the user, the speech corresponding to the specified area corresponding to the acquired content from among a group of speeches corresponding to areas existing in the direction that the user is facing on the basis of the position of the user.

4. The speech providing device according to claim 1, wherein the instructions cause the processor to perform:
providing the speech subjected to acoustic processing corresponding to a positional relationship between the user and the specified area, to the user.

5. The speech providing device according to claim 1, wherein the instructions cause the processor to perform:
providing the speech depending on a change in the position of the user or a change in the direction that the user is facing.

6. The speech providing device according to claim 5, wherein the instructions cause the processor to perform:
providing a speech changed from the speech corresponding to the specified area existing in the direction that the user is facing depending on a change in the direction that the user is facing, to the user.

7. The speech providing device according to claim 1, wherein the instructions cause the processor to perform:
providing the speech, a sound volume of which is changed depending on a change in the position of the user or a change in the direction that the user is facing, to the user.

8. The speech providing device according to claim 1, wherein the memory stores speech data indicating the speech and the specified area so as to be associated mutually; and
wherein the instructions cause the processor to perform:
reading from the memory the speech data associated with the specified area existing in the direction that the user is facing on the basis of the position of the user and providing the speech data to the user.

9. The speech providing device according to claim 1, wherein the speech is a speech being emitted or collected in the specified area.

10. A speech reproducing device comprising:
a positioning sensor;
a direction sensor;
a memory that stores instructions; and
a processor that executes the instructions,
wherein the instructions cause the processor to perform:
detecting a position of a user via the positioning sensor and a direction that the user is facing via the direction sensor;
acquiring speech data corresponding to an area existing in a direction that the user is facing on the basis of the position of the user;
reproducing the speech data; and
in response to detecting a change from the direction that the user was facing to an alternate direction:
changing the speech data from the speech corresponding to the area to an alternate speech data corresponding to an alternate area existing in the alternate direction depending on the associated rate of the change.

11. A speech providing method comprising the steps of:
acquiring, using a processor, a position of a user via a positioning sensor and a direction that the user is facing via a direction sensor;
acquiring an attribute of the user;
specifying a specified area based on a degree of association between the attribute of the user and attributes of areas;
providing a speech to the user corresponding to the specified area, wherein
the speech subjected to acoustic processing corresponding to the position of the user and a position of the specified area; and
in response to detecting a change from the direction that the user was facing to an alternate direction and an associated rate of the change:
changing the speech from the speech corresponding to the area to an alternate speech corresponding to an alternate area existing in the alternate direction depending on the associated rate of the change.

12. The speech providing method according to claim 11, wherein the acquiring step acquires the position of the user and the direction that the user is facing from a user terminal used by the user; and
the providing step provides speech data indicating the speech to the user terminal.

13. The speech providing method according to claim 11, wherein
the providing step acquires a content designated by the user and provides, to the user, the speech corresponding to the specified area corresponding to the acquired content from among a group of speeches corresponding to areas existing in the direction that the user is facing on the basis of the position of the user.

14. The speech providing method according to claim 11, wherein
the providing step provides the speech depending on a change in the position of the user or a change in the direction that the user is facing.

15. The speech providing method according to claim 11, wherein
the providing step reads the speech data associated with the specified area existing in the direction that the user is facing on the basis of the position of the user from a storage for storing speech data indicating the speech and the specified area so as to be associated mutually and provides the speech data to the user.

16. The speech providing method according to claim 11, wherein
the speech is a speech being emitted or collected in the specified area.

* * * * *